(12) United States Patent
Pell

(10) Patent No.: US 6,250,585 B1
(45) Date of Patent: Jun. 26, 2001

(54) IMPELLERS WITH BLADELIKE ELEMENTS AND COMPLIANT TUNED TRANSMISSION SHAFTS AND VEHICLES INCLUDING SAME

(75) Inventor: Charles A. Pell, Durham, NC (US)

(73) Assignee: Nekton Technologies, Inc., Durham, NC (US)

( * ) Notice: Subject to any disclaimer, the term of this patent is extended or adjusted under 35 U.S.C. 154(b) by 0 days.

(21) Appl. No.: 09/148,370

(22) Filed: Sep. 4, 1998

Related U.S. Application Data

(60) Provisional application No. 60/057,959, filed on Sep. 5, 1997.

(51) Int. Cl.$^7$ ................................................ B64C 33/00
(52) U.S. Cl. ........................ 244/22; 244/72; 416/83; 440/13
(58) Field of Search .................................. 244/11, 22, 72; 440/13–16; 416/79, 81, 83

(56) References Cited

U.S. PATENT DOCUMENTS

| | | | | |
|---|---|---|---|---|
| 2,086,883 | * | 7/1937 | Shanley | 244/22 |
| 2,985,407 | * | 5/1961 | Foster | 244/22 |
| 4,053,122 | * | 10/1977 | Gar | 244/22 |
| 4,139,171 | * | 2/1979 | Harris | 244/22 |
| 4,793,573 | * | 12/1988 | Kelfer | 244/72 |

FOREIGN PATENT DOCUMENTS

| | | | | |
|---|---|---|---|---|
| 2706099 | * | 8/1978 | (DE) | 244/72 |
| 3806138 | * | 9/1989 | (DE) | 244/72 |
| 415566 | * | 8/1934 | (GB) | 244/72 |
| 1523902 | * | 9/1978 | (GB) | 244/72 |

* cited by examiner

*Primary Examiner*—Galen L. Barefoot
(74) *Attorney, Agent, or Firm*—Myers, Bigel, Sibley & Sajovec

(57) ABSTRACT

A vehicle with improved maneuverability includes: a vehicle body; a first bladelike element; a first tuned compliant transmission shaft attached to the bladelike element; and a reciprocating unit for reciprocally driving the bladelike element within a fluid medium in a first travel path such that interaction between the bladelike element and a fluid medium produces propulsive forces that propel the vehicle body in a desired direction. Preferably, the pitch and heave natural frequencies of the natural transmission shaft are approximately equal to each other and to the natural bending frequency and torsional frequency of the bladelike element, and the natural thrust frequency of the transmission shaft is often approximately twice that of the pitch frequency. In this configuration, the vehicle can be directed in virtually any direction, the directing force is be generated far more quickly than is the case for prior art vehicles, and energy typically lost as shaking or vibration instead provides thrust.

25 Claims, 15 Drawing Sheets

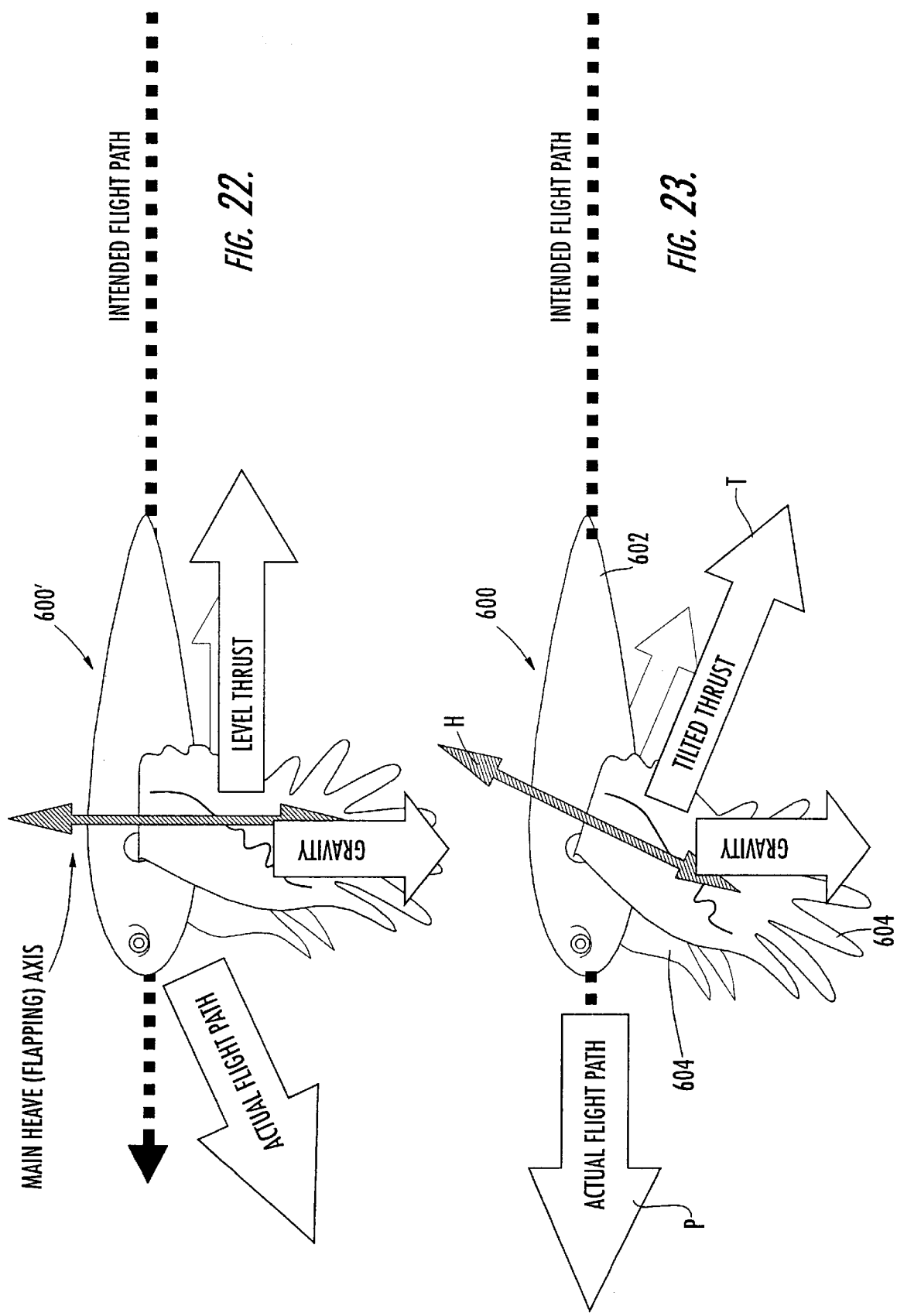

IMPELLERS WITH BLADELIKE ELEMENTS AND COMPLIANT TUNED TRANSMISSION SHAFTS AND VEHICLES INCLUDING SAME

RELATED APPLICATIONS

This application claims priority from U.S. Provisional Patent Application Ser. No. 60/057,959, filed 9 Sep. 1997.

FIELD OF THE INVENTION

The present invention relates generally to devices for producing thrust in fluid media, and more particularly to fluid impellers.

BACKGROUND OF THE INVENTION

Vehicles designed to navigate in fluid media (i.e., water and air) are often driven by conventional propellers. Such devices typically comprise a rotating shaft having blades mounted thereto. Each blade is mounted such that its longitudinal axis is generally normal to the shaft and its transverse axis forms an oblique angle with the shaft. Continuous rotation of the shaft causes the blades to turn within the fluid; in doing so, the blades generate thrust along the shaft longitudinal axis, with the direction of the thrust (and the direction of travel of the vehicle) being determined by which edge of the blades leads during rotation. Such propellers are very commonly used as the primary propulsive device in airplanes, power boats and submarines.

Propellers are particularly effective in generating a steady state fluid force, which enables propeller-driven vehicles to cruise at a steady speed. However, propellers typically require blade travel of several chord lengths to generate their maximum force for a given rotation rate in order for the steady-state circulation pattern to form around the blades. As a result, propellers are not particularly effective at producing short duration, large impulses, such as those needed to maneuver a vehicle quickly. Also, the direction of thrust production is unchangeable, always coaxial with the propeller shaft, and requires extra machinery for redirecting that shaft or the thrust using a rudder. The inability to maneuver the vehicle can present safety hazards, especially in conditions where there are permanent structures, wildlife, or rapidly changing conditions in the fluid medium.

To improve maneuverability of water and air craft, fluid impellers have been developed. Fluid impellers typically include a blade or foil that is moved through the fluid with a reciprocating or pivoting motion. Most fluid impellers can be categorized as one of three basic types: flexible rudders; sweeping (or flapping) blades; and "heave and pitch" devices. Each of these is described in detail below.

A flexible rudder typically consists of an elongate flexible plate that is often shaped like a fish or fishtail. The plate is mounted to the vehicle via a rigid driveshaft (usually vertical) that is, in turn, mounted in a rigid bushing into the vehicle hull. The driveshaft is pivoted about its longitudinal axis to generate a sweeping motion of the "tail" of the blade, with the pivot axis passing through the blade. Fluid resistance creates a phase lag between the rotary sweep motions of the nose and tail of the blade, which generates and propagates bending waves traveling tailward. The flexible rudder is advantageous because, if properly designed, it can be used to create thrust in any direction normal to the driveshaft. However, the hull of the vehicle will shake and vibrate due to the unbalanced lateral (heaving) and the longitudinal (thrust) forces generated by the waving blade in its fixed mount. Also, the thrust output dips to zero near the natural frequency of the system, as two nodes are created on the flexible blade: one at the driveshaft; and one at approximately three-quarter of the blade length (i.e., a standing wave results), thereby destroying the propagation of waves.

Sweeping or flapping blades employ a rigid driveshaft that is rotatively mounted in a bushing on the hull of the vehicle. The driveshaft then extends in a direction normal to the axis of rotation of the bushing (often horizontal), then extends parallel to the axis of rotation (often vertical). The blade attaches to this latter vertical portion of the driveshaft, either rigidly (in the case of a flexible foil) or with a spring joint (in the case of a rigid foil). Reciprocation of the driveshaft about its pivot point within the bushing generates a sweeping motion of the blade. Fluid resistance creates a phase lag between the leading and trailing edges, which generates thrust. Sweeping blades can be advantageous over flexible rudders in that the larger area of sweep can produce more rapid travel of the trailing edge of blade, which can produce a higher thrust. However, because of its position relative to the craft, it generally cannot produce thrust in all directions. In addition, the craft tends to shake due to the unbalanced forces along or acting along the lateral, thrust, and torsional axes generated by the reciprocating lever arm in its fixed mount.

Heave and pitch devices typically include one or more rigid plates attached at the ends of rigid driveshafts. Typically, each driveshaft is mounted in a rigid coupling within which it can pivot; this coupling is then mounted to a sliding carriage that slides within a track. The track is then mounted to the hull of the craft. In operation, the carriage reciprocates on the track; simultaneously, the blade is actively pivoted in a manner to generate lift, as in a hydrofoil. Compared to flexible rudders and sweeping blades, heave and pitch devices better control the balance between lift and drag. Unfortunately, directional control is typically inferior to that of flexible rudders, and thrust in all directions is not possible without re-orientation of the carriage. Also, these devices are more complicated (i.e., have more moving parts) than flexible rudders and sweeping blades. Moreover, the vehicle hull tends to shake and vibrate due to the oscillatory thrust forces generated by the driveshaft in its longitudinally fixed mount absent some control apparatus designed to eliminate thrust oscillation. Note that the prior art discloses the use of multiple blades working in opposition to attempt to cancel the heave axis vibration inherent to all oscillatory propulsors. However, this requires multiple blades and that such blades always work in opposition. Even so, this still fails to address and correct for other vibrations, such as those along the thrust axis.

SUMMARY OF THE INVENTION

In view of the foregoing, it is an object of the present invention to provide a fluid impeller that can produce sudden thrust.

It is another object of the present invention to provide a fluid impeller that can produce smooth cruising thrust.

It is also an object of the present invention to provide a fluid impeller that reduces the tendency of a vehicle hull to shake or vibrate during maneuvering and/or cruising.

It is another object of the present invention to provide a fluid impeller that can produce thrust in any direction.

It is a further object to provide a fluid impeller that contains relatively few moving parts.

These and other objects are satisfied by the present invention, which is directed to vehicles with improved maneuverability. Such vehicles include: a vehicle body; a first bladelike element; a first tuned compliant transmission shaft attached to the bladelike element; and a reciprocating unit for reciprocally driving the bladelike element within a fluid medium in a first travel path such that interaction between the bladelike element and a fluid medium produces propulsive forces that propel the vehicle body in a desired direction. Preferably, the pitch and heave natural frequencies of the transmission shaft are approximately equal to each other and to the natural bending and natural torsional frequencies of the bladelike element, and the natural thrust frequency of the transmission shaft is often approximately twice that of the pitch frequency. In this configuration, the vehicle can be directed in virtually any direction, the directing force is generated far more quickly than is the case for prior art vehicles, and energy typically lost as shaking or vibration in all axes instead is smoothly transmitted as thrust to the vehicle.

Such a vehicle may have a plurality of bladelike elements and a plurality of tuned compliant transmission shafts, each of which is attached to a respective one of the plurality of bladelike elements. The movement of the transmission shafts and bladelike elements may be synchronized, opposed, or in any phase relation depending on the desired end result.

BRIEF DESCRIPTION OF THE FIGURES

FIG. 22 is a side view of a prior art airship.

FIG. 23 is a side view of an airship of the present invention which is configured such that the heave axis is tilted downwardly and rearwardly from the hull relative to the intended flight path.

DETAILED DESCRIPTION OF THE PREFERRED EMBODIMENTS

The present invention will be described more particularly hereinafter with reference to the accompanying drawings. The invention is not intended to be limited to the illustrated embodiments; rather, these embodiments are intended to disclose the invention fully and completely to those skilled in this art.

Figure 1:
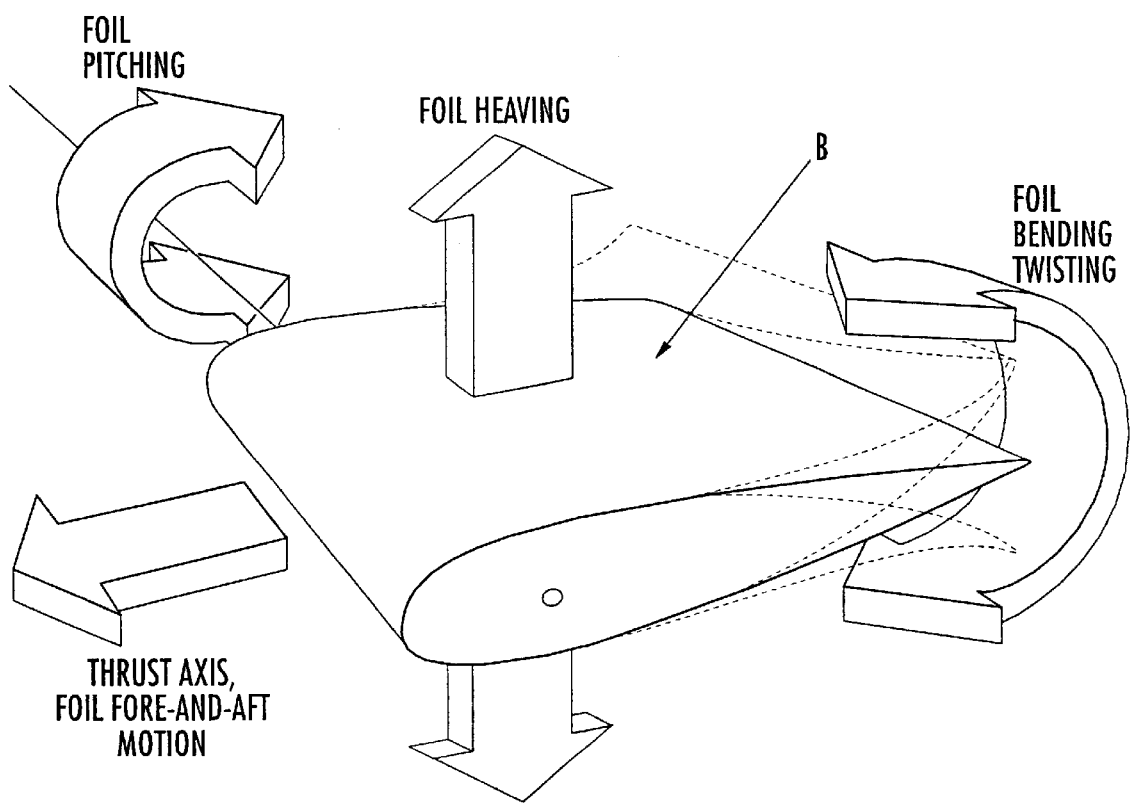
FIG. 1 is a schematic representation of the axes of movement of a bladelike element.

In describing the present invention, reference will be made to different types of movement of a bladelike element and a vehicle to which such an element is attached. These are shown in FIG. 1, which illustrates a blade B of generally fusiform cross-section. The axis that is generally parallel with the direction of travel is the "trust" axis, along which the blade B will surge "fore-and-aft." The axis that is normal to the plane of blade B is the "heave" axis, along which the blade B will "heave." The axis that is perpendicular to the thrust and heave axes is the "pitch" axis; the blade B will rotate, or "pitch," about this axis. Finally, the blade B may bend or twist from its undeformed shape; this motion will simply be referred to as "bending."

Figure 2:
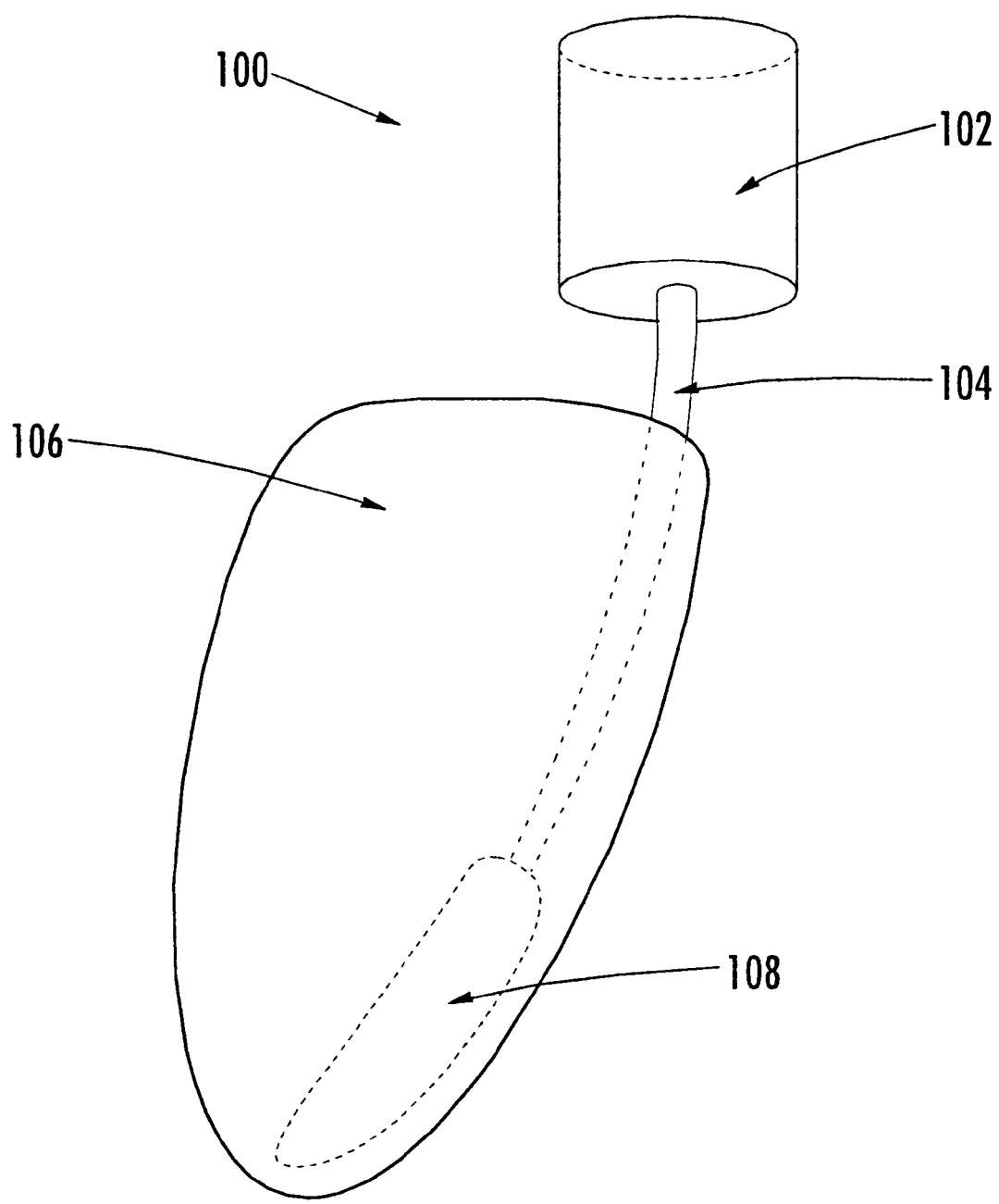
FIG. 2 is a perspective view of an impeller system of the present invention.

One aspect of the present invention is a fluid impeller that employs a tuned, compliant transmission unit (preferably with a compliant shaft). Such an impeller is schematically illustrated in a simple form in FIG. 2. Therein, an impeller unit 100 comprises a motor 102, a compliant driveshaft 104 mounted at one end to the motor 102, a fin 106, and an anchor 108, such as a bolt, rivet, adhesive, fin tip anchor, or other connecting means, that mounts the fin 106 to the free end of the driveshaft 104. In the illustrated configuration, the driveshaft 104 is substantially straight, such that the fin 106 is anchored to the driveshaft 104 directly beneath the motor 102.

The motor 102 can be any motor or other rotary input means, such as a servomotor or mechanical oscillator, that can rotate the driveshaft 104. Preferably, the motor 102 is configured to induce reciprocating rotative movement to the driveshaft 104. It can be configured to rotate through any desired range of rotation (e.g., 45 degrees, 90 degrees, 180 degrees, etc.) and frequency, and to do so at any orientation relative to a vehicle to which the motor 102 is mounted.

The blade 106 is typically generally bladelike and can be of virtually any shape known to those skilled in this art to be suitable for an impeller. For example, the blade 106 may be larger along the pitch axis than the thrust axis or vice versa, or these dimensions may be generally similar. The blade 106 may be rigid or flexible, and its modulus of elasticity can be constant through time and/or the blade volume (as when formed of a single material), or its modulus of elasticity can be arranged to accommodate the differing distributed loads acting on the blade, redirecting fluid flow in the desired manner, or its modulus of elasticity may be variable, such as through the inclusion of a strain-rate dependent viscoelastic material or an electromagneto-rheological fluid.

The driveshaft 104 should be elastic and compliant. As such, the driveshaft 104 should be formed of a material that allows torsional deformation along the pitch axis, and bending such that the blade 106 can deflect relative to the motor 102 along the heave and thrust axes. Like the blade 106, the compliance of the driveshaft 104 may be constant and inherent to the material from which it is formed. Alternatively, the driveshaft 104 may have variable compliance, such as when these fibers are arranged to bias the deformations, or such as when a strain-rate dependent viscoelastic material or an electromagneto-rheological fluid is employed to modulate the compliance through the propulsive stroke. Also, the driveshaft 106 may be a single cylindrical rod, or may take a more complex form, such as a flexible helical spring, woven cable, segmented shaft, or shaft pair joined with a universal joint.

It is preferred that the compliance of the driveshaft 104 and the blade 106 be selected based on the desired performance characteristics of the impeller unit 100, and in particular the input frequency ($\omega_{in}$) of the motor 102. More specifically, it is preferred that the natural frequency of the driveshaft 104 as it deforms in twisting about the pitch axis ($\omega_\tau$) is often (but not always) approximately the same as $\omega_{in}$, the natural frequency of the driveshaft 104 as it bends along the thrust axis ($\omega_t$) is approximately twice that of $\omega_{in}$, the natural frequency of the driveshaft 104 as it bends along the heave axis ($\omega_h$) is approximately the same as $\omega_{in}$, and the natural frequency of the blade 106 as it bends ($\omega_k$) is approximately the same as $\omega_{in}$. The natural frequencies are, of course, dependent on the geometry and material of the driver shaft 104 and the blade 106 and the properties of the fluid for which the system 100 is designed. With these relationships between the driveshaft 104, the blade 106, the motor 102, and the fluid medium, the system 100 can be considered "tuned" to the extent that the improved performance characteristics of the impeller system 100 can be realized for cruising or maneuvering. Active modulation of these relationships can tune the system 100 for either one.

Figure 3:
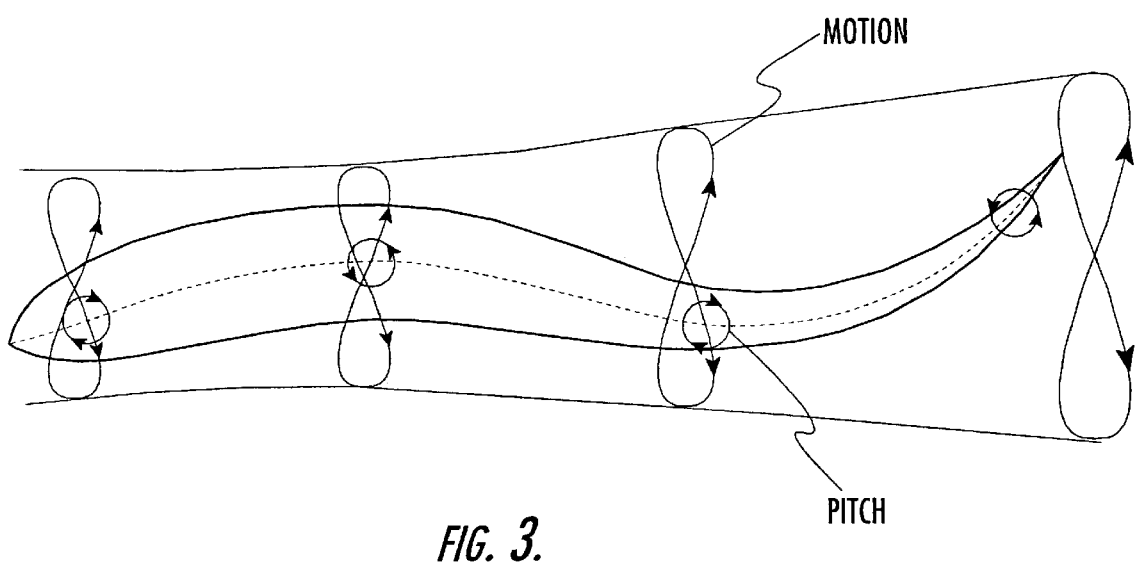
FIG. 3 is a top view of the "figure-8" motion followed by the blade of the tuned impeller system of FIG. 2 during cruising.

While not wishing to be bound by any one theory of operation, it is believed that the employment of a tuned compliant shaft 104 enables the blade 106 to smoothly impart components of its motion to an attached vehicle that ordinarily (i.e., in impeller systems in which a non-compliant, or non-tuned transmission means is employed) are transmitted to the vehicle as shaking or vibration. For cruising, rather than the tip of the blade tail only following a figure-8 path, such as that followed by a flexible rudder, the compliant driveshaft 104 enables all portions of the blade 106 and driveshaft 104 to follow a "figure-8" shaped or other nodeless path (see FIG. 3), in which each point on the blade 106 has a fore-and-aft and heave components relative to the motor 102 as well as a pitch component. This nodeless motion is similar to that of the motions followed by the propelling limbs, wings, bodies, or tails of many animal species as they swim or fly. The result is a more efficient and smooth conversion of input energy to thrust.

Figure 4:
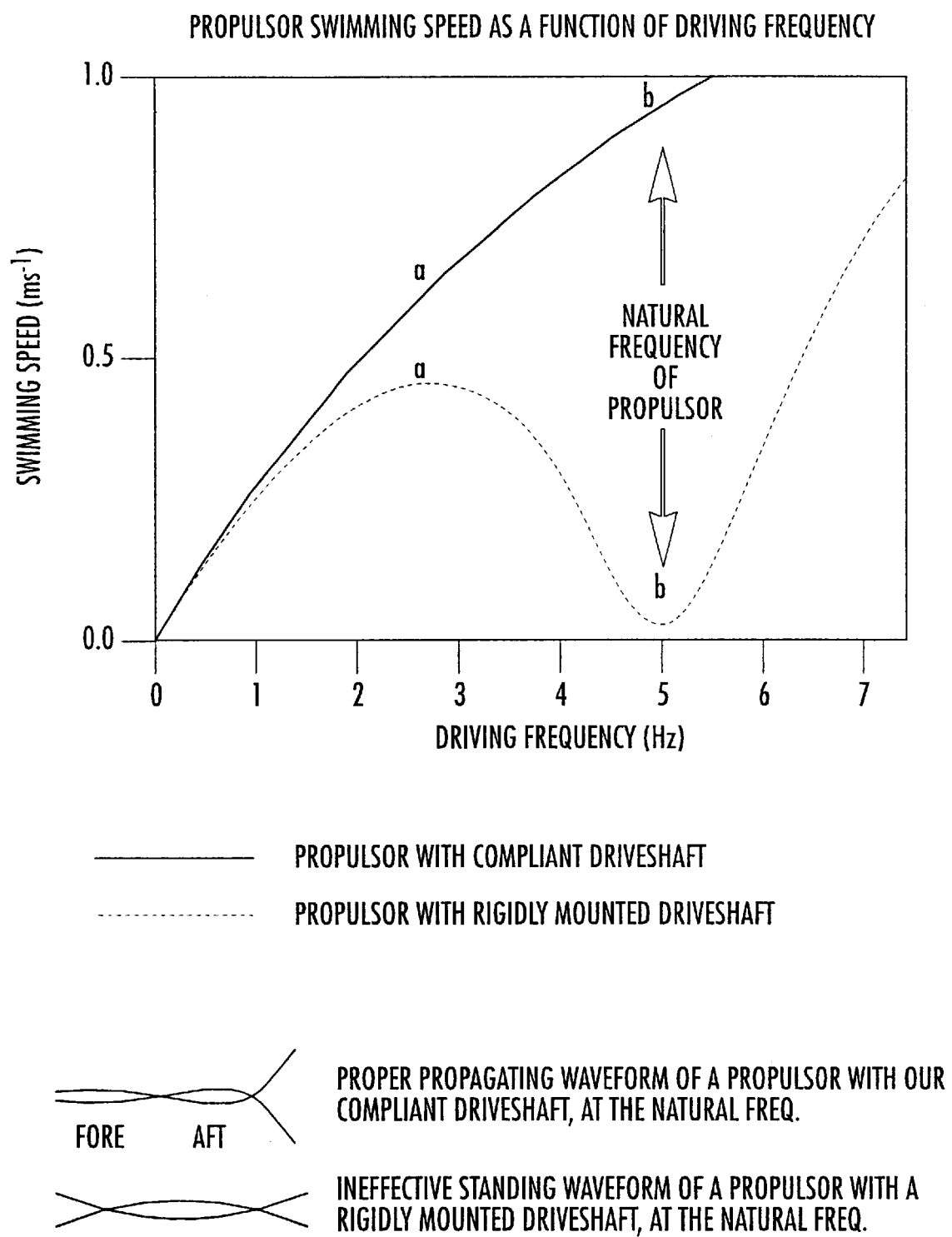
FIG. 4 is a graph plotting thrust output as a function of input frequency for impeller systems having rigid and compliant shafts.

This result is demonstrated in FIG. 4, which is a graph plotting thrust output as a function of input frequency for both a flexible rudder system having a rigid driveshaft and a fluid impeller of the present invention having a compliant elastic driveshaft tuned to the input motor. The flexible rudder system demonstrates increased thrust initially with increasing oscillation frequency, then shows a decline in thrust as the natural input frequency of the system is approached. However, when a compliant elastic shaft tuned to the input frequency is employed, the result is ever-increasing thrust with increasing oscillation frequency.

The compliant driveshaft of a tuned impeller system functions as a low-band pass filter for the transmission of thrust to the vehicle. Consequently, the shaking and vibration that is transmitted to a vehicle attached to a conventional fluid impeller system is reduced considerably or even eliminated.

The impeller system 100 also provides thrust very rapidly. Unlike a conventional propeller, which requires blade travel of several chord lengths for the fluid circulation pattern to form around the blades (also known as the "Wagner effect"), the impeller system 100 has proven to provide high thrust almost immediately. Moreover, because the illustrated impeller system 100 is configured so that the blade 106 can pivot in any rotative direction on the straight driveshaft 104, the system has the capability of providing the desired thrust in any direction normal to the driveshaft 104.

The impeller system 100 can function as the primary thrust source for a vehicle, or can serve as an auxiliary maneuvering system. For example, a vehicle may include a conventional propeller as the primary source of thrust for steady state cruising, and may further include one or more impeller systems 100 attached to the hall for imparting rapid thrust bursts for accelerating, decelerating, or changing direction. When not used for active thrust production in maneuvering, the impeller system 100 functions as a normal control surface (i.e., a bow plane). If the blade 106 of the impeller system 100 is formed of a shape memory polymer, then one may change the stiffness of the blade 106 to improve its use for either purpose.

Figure 5:
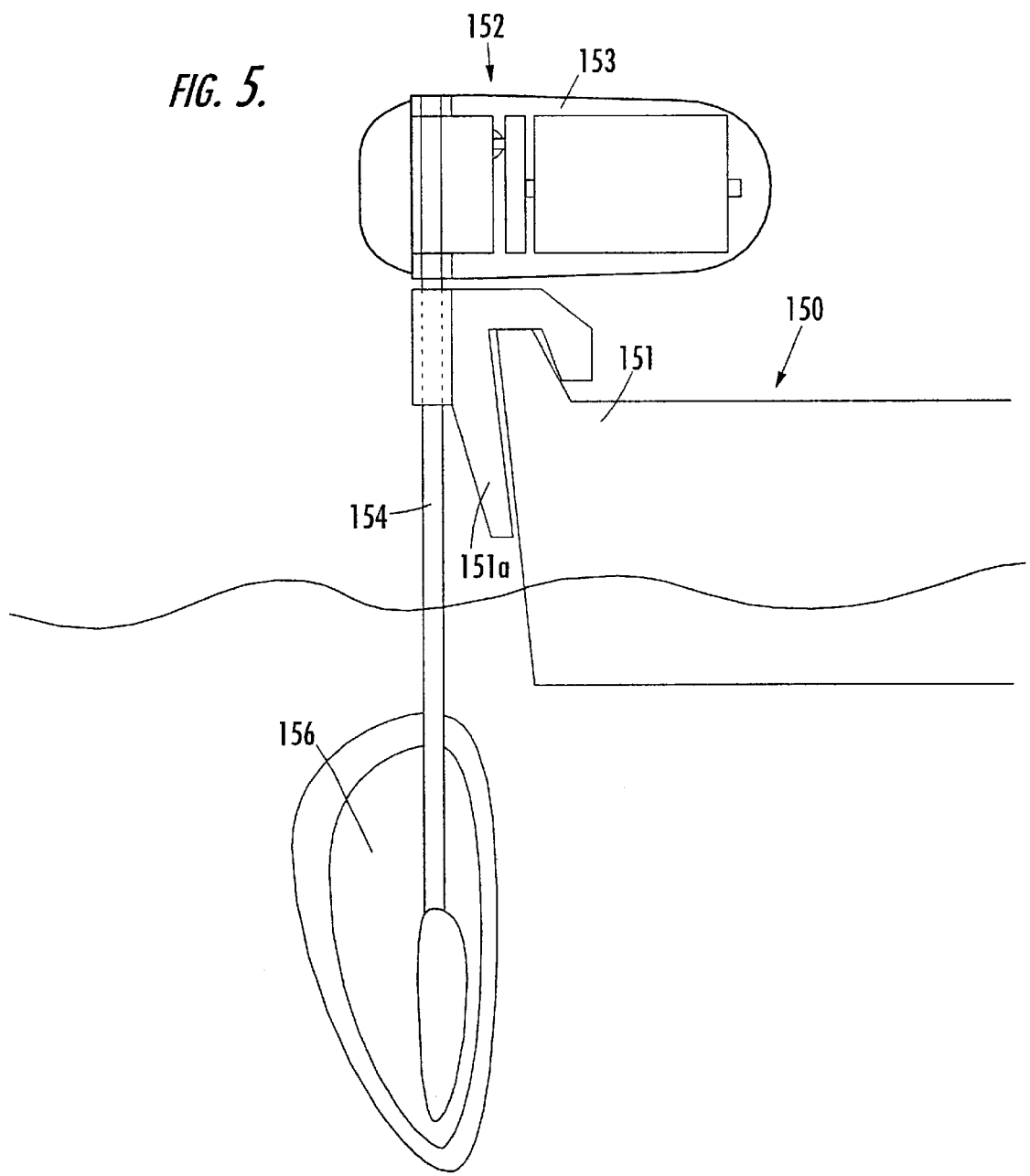
FIG. 5 is a partial side view of a trolling boat employing a trolling motor assembly of the present invention.

One embodiment of this concept is shown in FIG. 5, in which a boat 150 is illustrated. The boat 150 includes a trolling motor assembly 152 having a motor 153 with a downwardly-extending driveshaft 154 attached to a blade 156. Preferably, the motor 153 is mounted to the hull 151 with a compliant, tuned bracket 151a. The driveshaft 154 is preferably elastic and compliant in thrust, heave and pitch. In operation, the driveshaft 154 pivots about its longitudinal axis through a desired angle, which in turn pivots the blade 156. The compliance in the driveshaft 154 and mounting bracket 151a provide the trolling motor assembly 152 with the ability to drive and maneuver the boat 150 easily in any direction without imparting unwanted vibration or shaking during cruising or maneuvering.

Those skilled in this art will recognize that, although the illustrated trolling motor assembly 152 employs a straight driveshaft 154 that pivots about the pitch axis, a drive shaft bent at 90 degrees to the pitch axis (that approximates the heaving movement of a sweeping or flapping blade) can also be employed, and the advantages discussed hereinabove for a straight driveshaft as equally applicable as long as the bent driveshaft is compliant and substantially tuned to the motor 153, the blade 156 and the fluid. Similarly, a driveshaft that is bent either more or less than 90 degrees from the pitch axis, and which imparts both pitch and heave movement, can also provide these performance advantages if the driveshaft is compliant and tuned with the fluid and the other components of the trolling motor assembly 152.

Figure 6:
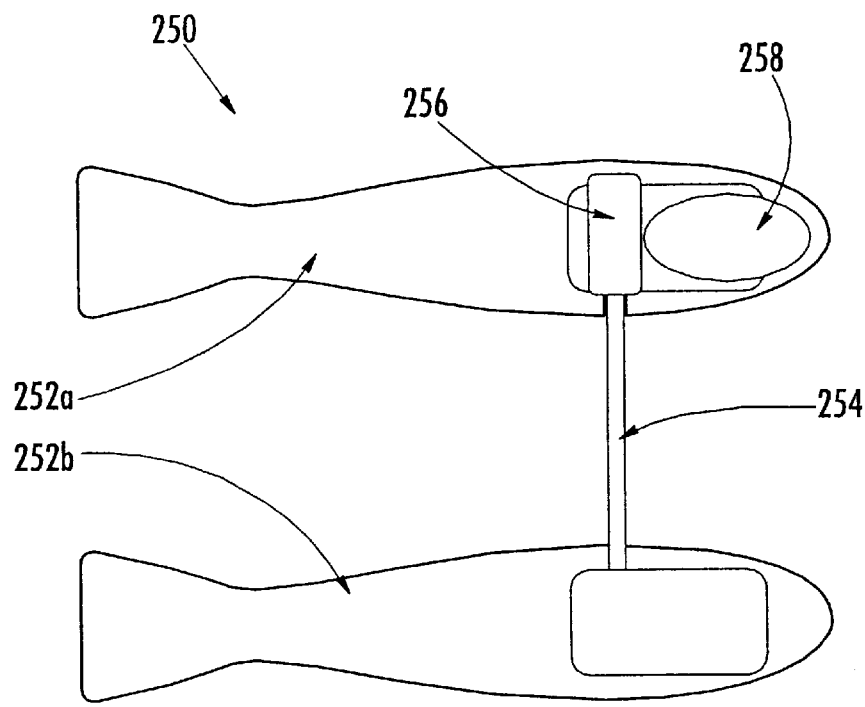
FIG. 6 is a side view of the fluid impeller of the present invention having two blade elements connected with the same driveshaft.
Figure 7:
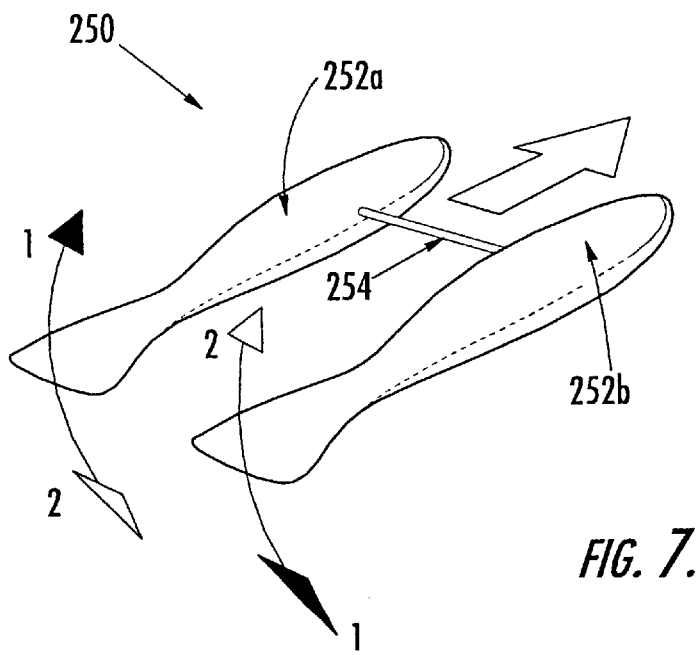
FIG. 7 is a perspective view of the dual bladed impeller system of FIG. 6 showing the opposed reciprocating motion of the blades.

With the present invention, a single bladelike element can be attached to a single shaft, as illustrated by the trolling boat 150 of FIG. 5, or multiple bladelike elements can be attached to a single shaft. FIGS. 6 and 7 illustrate an impeller system 250 that includes two fins 252a, 252b attached to a single driveshaft 254. The fin 252a includes a servomotor 256 and a controller 258 to control the movement of the fins 252a, 252b.

As illustrated in FIGS. 6 and 7, it is preferred that, during operation of the impeller system 250, the fins 252a, 252b move in an opposed fashion, such that the fin 252a extends up (or left) as the fin 252b extends down (or right). This movement is controlled by the servomotor 256 and the controller 258, which enable this motion of the fins 252a, 252b to occur even as they share the same shaft 254. Note that a 90° left motion of the fin 252a will generate opposed 45° motion of both fins 252a, 252b.

Figure 8:
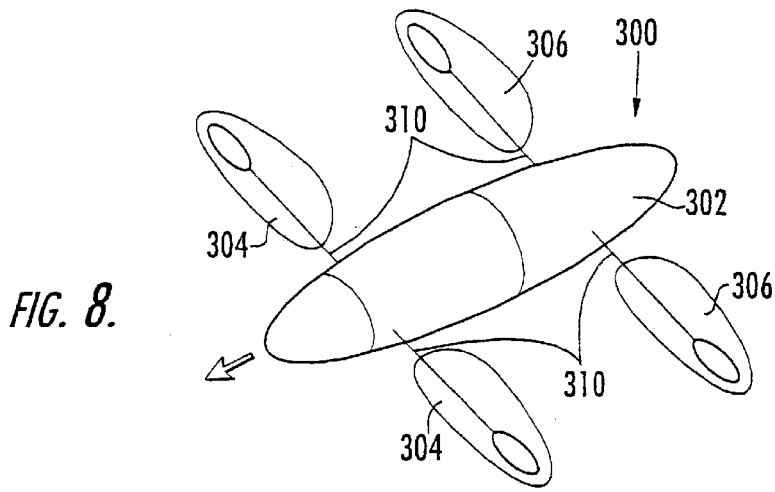
FIG. 8 is a perspective view of a watercraft of the present invention having four blade elements.
Figure 9:
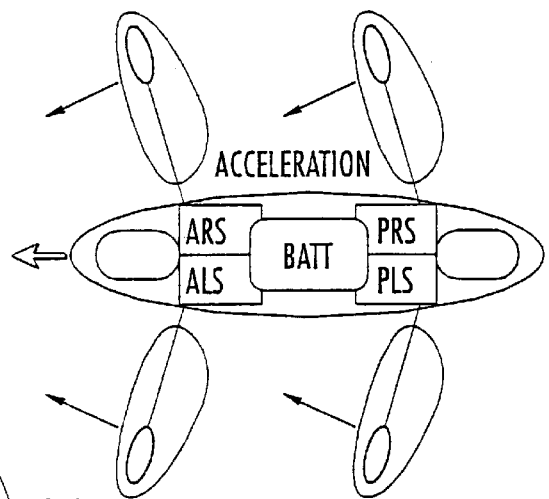
FIG. 9 is a top view of the watercraft of FIG. 8 showing the blade elements in their positions taken during acceleration.
Figure 10:
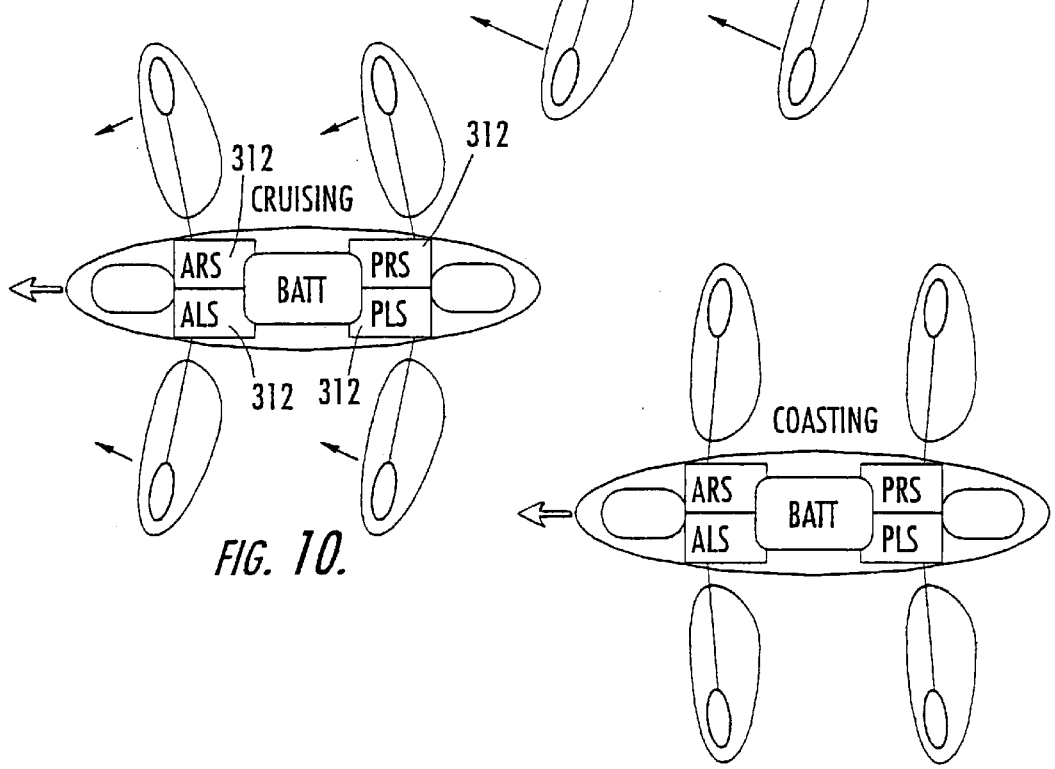
FIG. 10 is a top view of the watercraft of FIG. 8 showing the blade elements in their positions taken during cruising.
Figure 11:
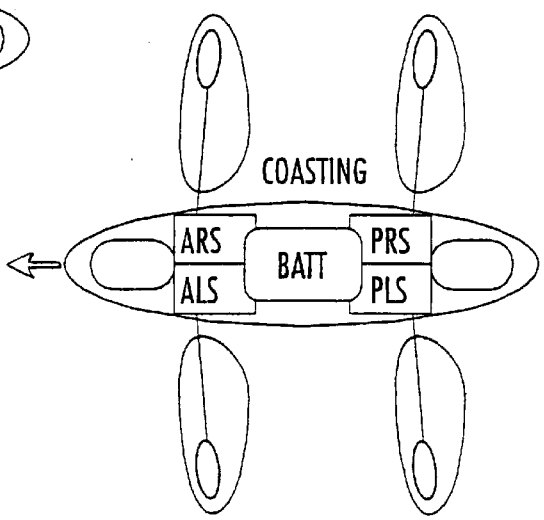
FIG. 11 is a top view of the watercraft of FIG. 8 showing the blade elements in their positions taken during coasting.

As shown in FIGS. 8 through 11, embodiments of the present invention can also include multiple fins attached to multiple shafts. FIG. 8 shows a watercraft 300 that includes a body 302 (with no preferred nose or tail), two elastic fins 304, and two elastic fins 306. Each fin 304, 306 is attached to a compliant elastic driveshaft 310 such that the end of the driveshaft 310 farthest from the body 302 is fixed to its respective fin 304, 306, but the remainder of the driveshaft 310 is free to spin relative to the fin. This freedom of rotation about the driveshaft 310 allows the fins 304, 306 to deform torsionally around the driveshaft 310 for increased compliant control and more efficient propulsion. The omnidirectional rotation of the servomotors 312 enables the watercraft 300 to translate and rotate about each of the three Cartesian axes, giving the watercraft 300 six degrees of freedom control. The driveshafts 310 are attached to individual servomotors 312 located within the body 302. In operation, because of the thrust axis compliance of the driveshafts 310, the fins 304, 306 extend into an endward position for acceleration (FIG. 9), an intermediate position for cruising (FIG. 10), or an opposite endward position for coasting (FIG. 11).

Figures 12, 13:
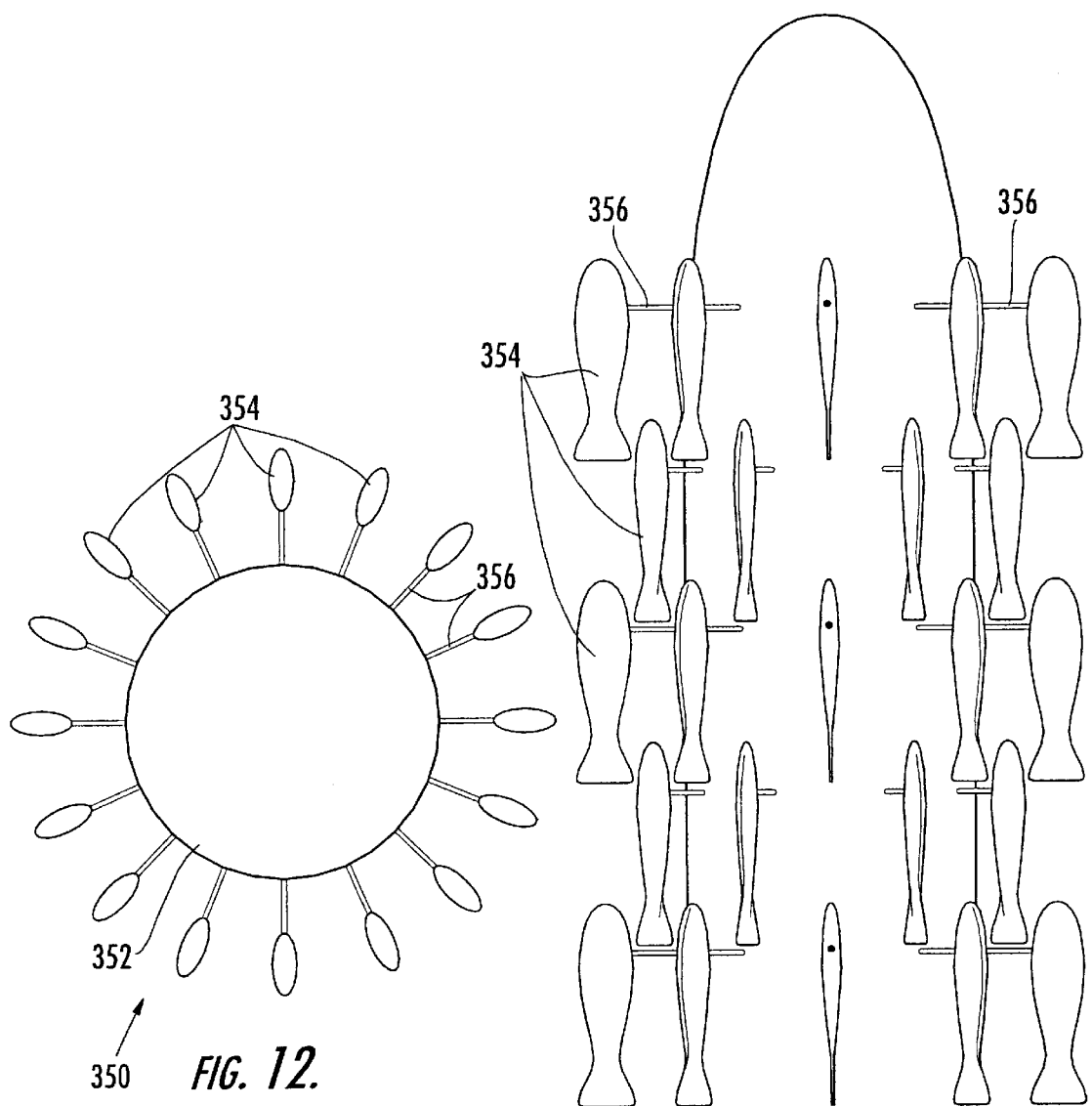
FIG. 12 is an end view of the submarine of the present invention.
FIG. 13 is a top view of the submarine of FIG. 12.

Another watercraft that utilizes multiple fins is illustrated in FIGS. 12 and 13. A submarine 350 has a tapered cylindrical body 352 and a plurality of fins 354, each of which is attached to the body 352 via a tuned compliant elastic driveshaft 356. The fins 354 are arranged in five rows that encircle the body 352. Each fin is positioned so that it is approximately equidistant from the fins in adjacent rows; i.e., it is circumferentially positioned between the fins of adjacent rows.

In this configuration, the fins 354 can benefit from two different effects observed in fish swimming as a school. The first is a proximity jet enhancement that has been observed (and confirmed mathematically) for fish swimming side-by-side. Alternately adjacent fish of approximately the same size undulating 180 degrees out of phase exhibit up to five times greater range or speed for the energy input as a fish swimming alone. Thus, by placing the fins 354 in the aforementioned side-by-side rows and undulating them 180 degrees out of phase, the submarine 350 can experience the aforementioned increase in thrust. Also, by offsetting the fins 354 in adjacent rows to be centered between the fins of the next adjacent row, the fins 354 mimic the behavior of schooling fish and experience increased thrust due to the phenomenon of "column forward flow."

In the submarine 350, the fins 354 can be controlled by individual motors, or can be controlled by other rotary input means. Those skilled in this art will also appreciate that the concept of many fins can be extended to other types of water craft, such as a boat, which can have rows of fins mounted to its underside or can have a single row of fins mounted to the underside of its stem. Also, those skilled in the art will understand that this arrangement can also be employed with aircraft.

Figure 14:
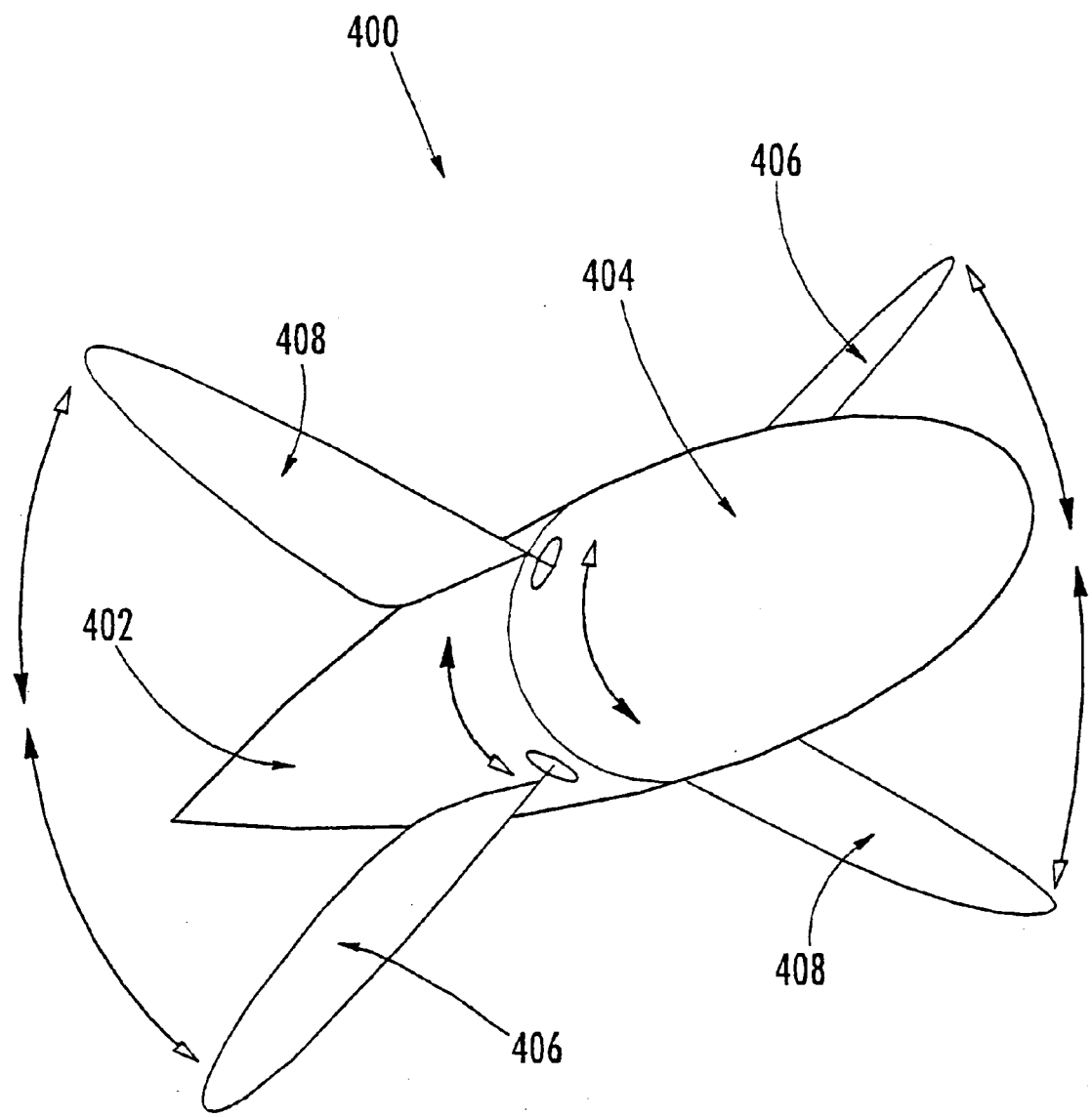
FIG. 14 is a perspective view of an aircraft of the present invention.
Figure 15:
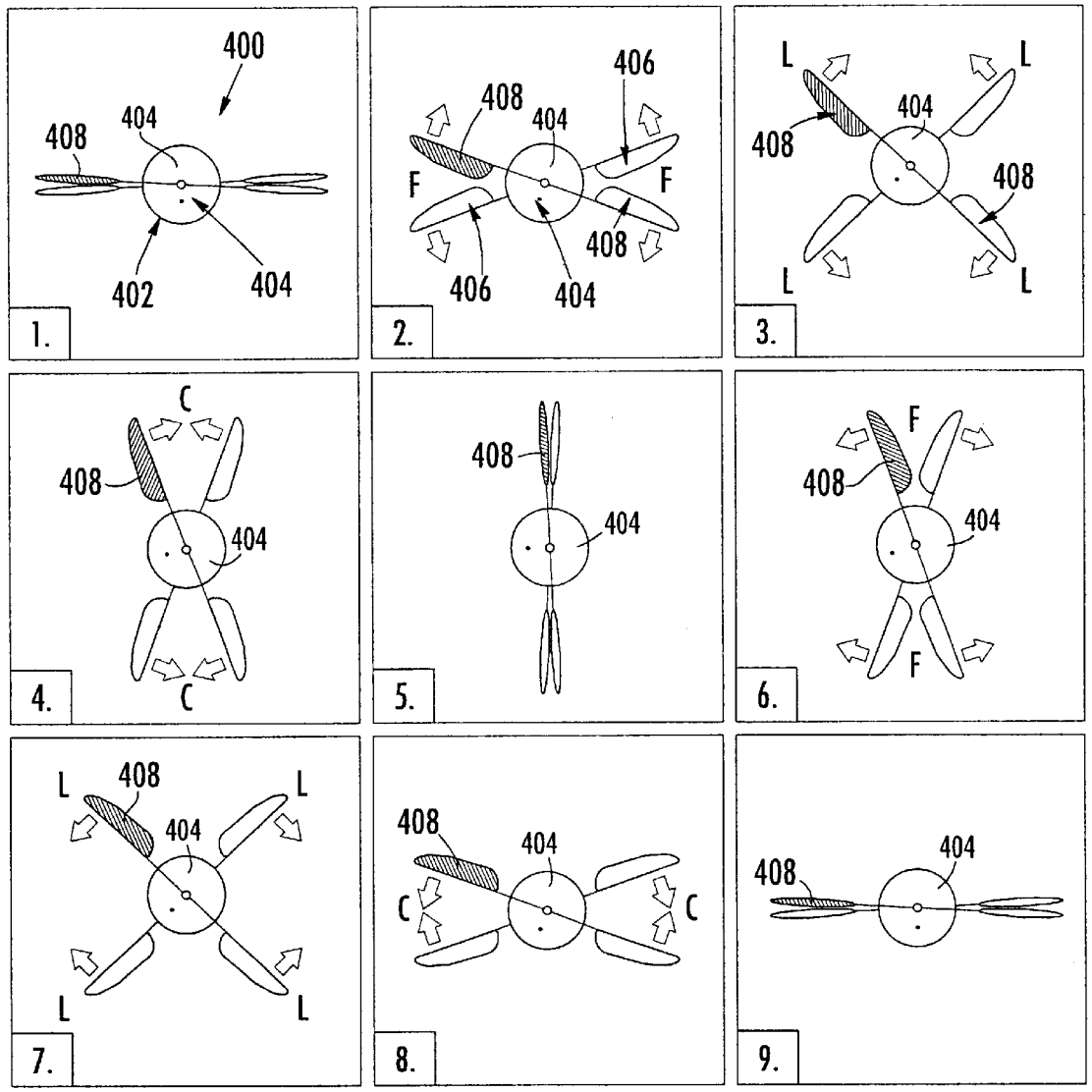
FIG. 15 is a series of front end views showing the motion of the blades of the aircraft of FIG. 14. Thrust is generated into the page, such that the vehicle travels in a direction toward the viewer.

An additional embodiment of the present invention having multiple blades is shown in FIGS. 14 and 15, in which a watercraft 400 is illustrated. The watercraft 400 includes a hull 402 and a nose 404 rotatably connected therewith. Two wings 406 are attached to the hull 402 180 degrees apart; similarly, two wings 408 are attached to the nose 180 degrees apart. The wings 406, 408 can be configured as described for fins 304, 306 to more easily permit compliant blade torsion.

In operation, the nose 404 rotates 180 degrees relative to the hull 402. This motion causes the wings 408 to flap relative to the wings 406. However, because of the reaction forces on the wings 406, 408, the nose 404 rotates only 90 degrees relative to the fluid medium, and the hull 402 also rotates 90 degrees relative to the fluid medium in the opposite rotative direction. These motions cause each wing 406 to first flap to clap one of the wings 408, then flap oppositely to clap the other wing 408 (see FIG. 15). Thrust is generated in three different ways. In FIG. 15, "F" indicates a "fling" stage thrust, in which adjacent wings 406, 408 positioned closely together are pulled apart (leading edges first) so that a low pressure region is created in the gap, which in turn establishes a strong circulation about the wings. This circulation both preserves maximum lift and ejects fluid to the rear. "C" indicates a "clap" stage thrust, in which adjacent wings 406, 408 come together (leading edges first) to force fluid to the rear. "L" indicates a "trust" (lift) as normally occurs around a foil moving through a fluid. These letters (F, C, L) mark where thrust is being generated by the "clap and fling" cycle (in all cases the thrust is directed away from the viewer and the vehicle is swimming toward the viewer). The torsional and pitch compliance the wings 406, 408 ensure rearward jet flow on both the "clap" and the "fling" motions. This process produces copious thrust and is called "clap and fling" locomotion.

Figure 16:
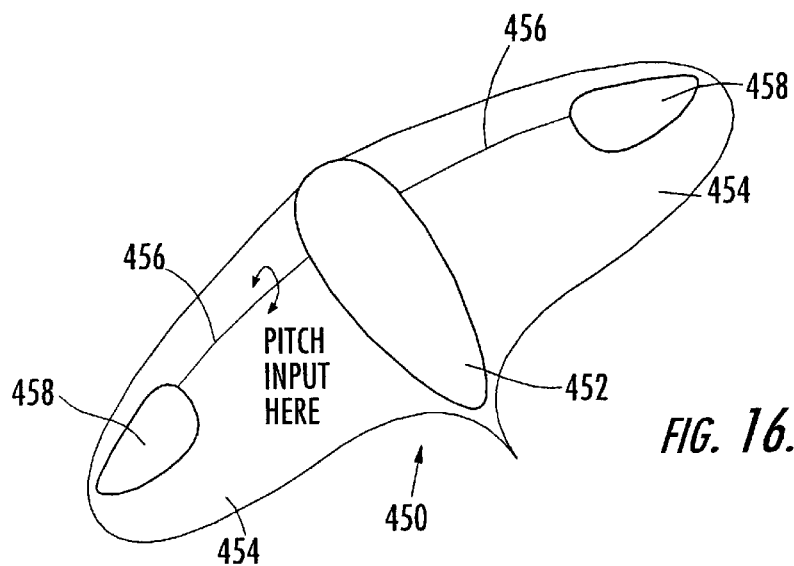
FIG. 16 is a top view of an underwater surveillance craft of the present invention.
Figure 17:
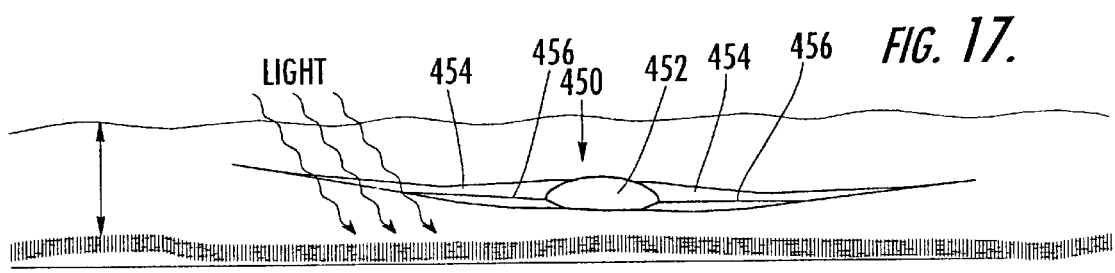
FIG. 17 is a front view of the watercraft of FIG. 16.
Figure 18:
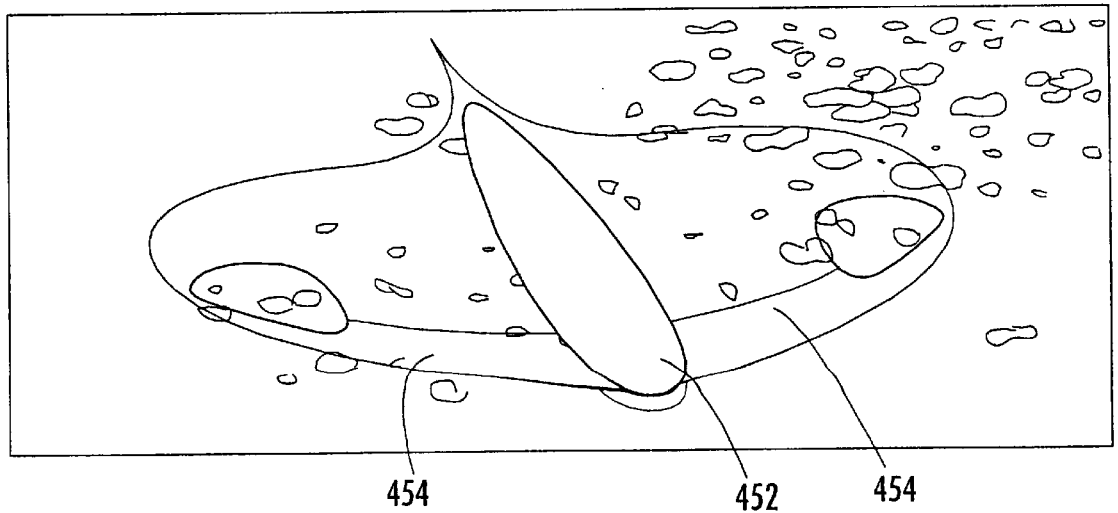
FIG. 18 is a perspective view of the watercraft of FIG. 16.

An additional embodiment of the present invention is shown in FIGS. 16 through 18, in which an underwater surveillance craft 450 is illustrated. The craft 450 includes a body 452 that is preferably colored to match the bottom of a shallow body of water. Two wings 454 are attached to the body 452; the wings 454 are preferably formed of a flexible clear material, such as polyurethane. Compliant elastic drive rods 456 extend from the body into each wing 454 and are anchored therein with tip anchors 458 so that the wings 454 are free to spin about the drive rod 456 like the fins 304, 306 of the watercraft 300. These structures are preferably formed of a clear material such as clear polycarbonate. The drive rods 456 are mounted to motors (not shown) located within the body 452.

In operation, the drive rods 456 are reciprocally driven by the motors to cause the wings 454 to pitch about the drive rods 458. This motion enables the craft 450 to move within the water. Because all visible portions of the craft 450 are either clear or colored like the bottom of the body of the water, the craft 450 is quite difficult to see, rendering it useful for surveillance activities in shallow waters, such as minesweeping.

Figure 19:
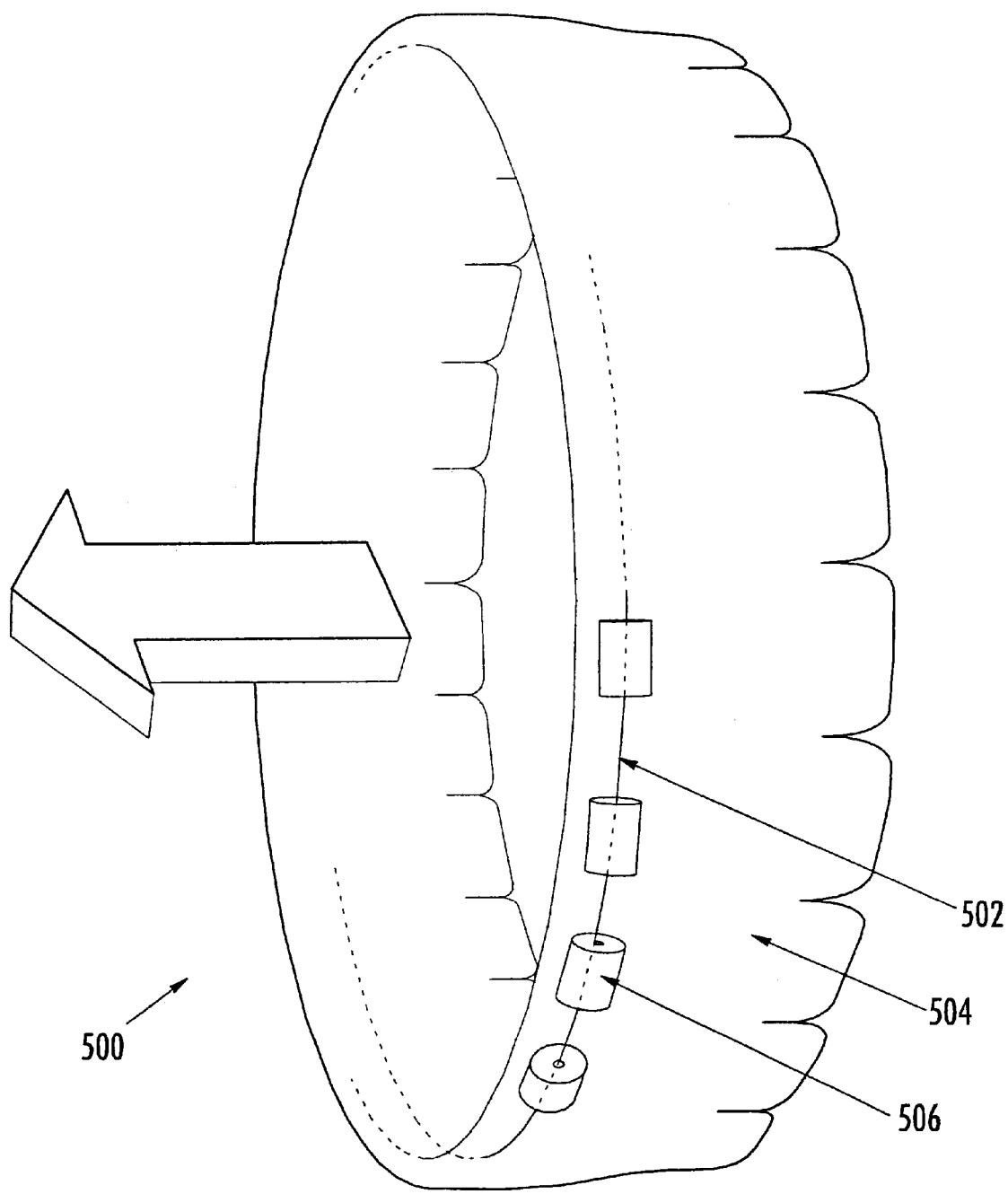
FIG. 19 is a top view of a sensor platform of the present invention.
Figure 20:
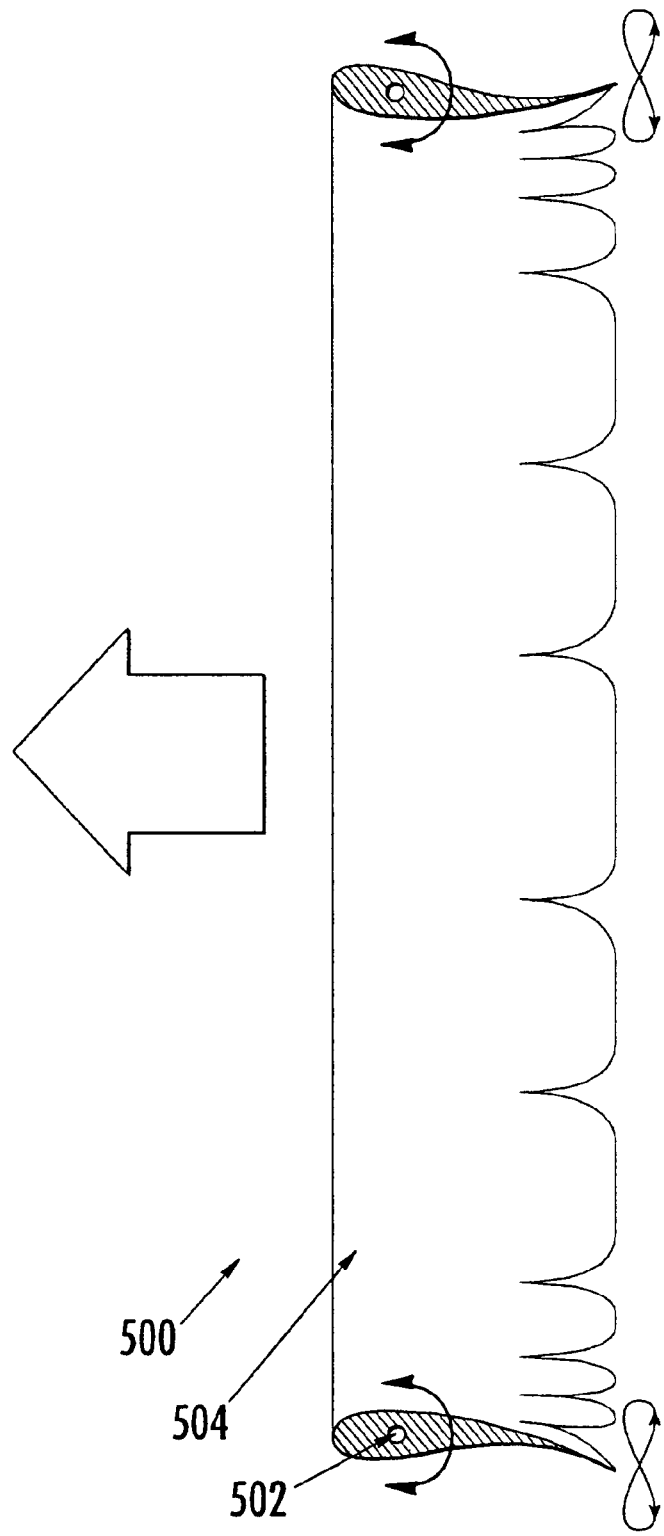
FIG. 20 is a side view of the sensor platform of FIG. 19.

FIGS. 19 and 20 shows an embodiment of the present invention in which a circular ring is employed as an impeller. In FIGS. 19 and 20, a sensor platform 500 includes a compliant semirigid ring 502 that is embedded within an elastomeric circular wing 504. Preferably, the wing 504 has a scalloped trailing edge. Multiple motors 506 are connected with the ring 502 and cause the wing 504 to pitch about the ring 502. Because the wing 504 is elastomeric, the wing 504 deforms during its pitching motion such that the heaving trailing edge lags behind the heaving leading edge; the phase lag between this heaving component and the pitching of the wing 504 results in thrust. The motors 506 may be actuated together or individually. When the motors 506 are individually activated, the compliance of the ring 502 serves as the compliant shaft, reducing otherwise inefficient shaking of the platform 500. Because there is no free tip on the wing 504, the sensor platform 500 should not experience tip vortex losses. It will be apparent to those skilled in this art, that the ring 502 may be driven in pitching to get heaving (as described), or in heaving to get pitching, wherein the heaving motion is generated by the ring 502 being a contractile tensile member made of shape memory alloy, thus requiring no motor at all.

The sensor platform can also be constructed with two or more concentric circular rings. If, for example, two circular wings are included, pitching of the wings can be controlled that they "clap and fling" together and apart.

Figure 21:
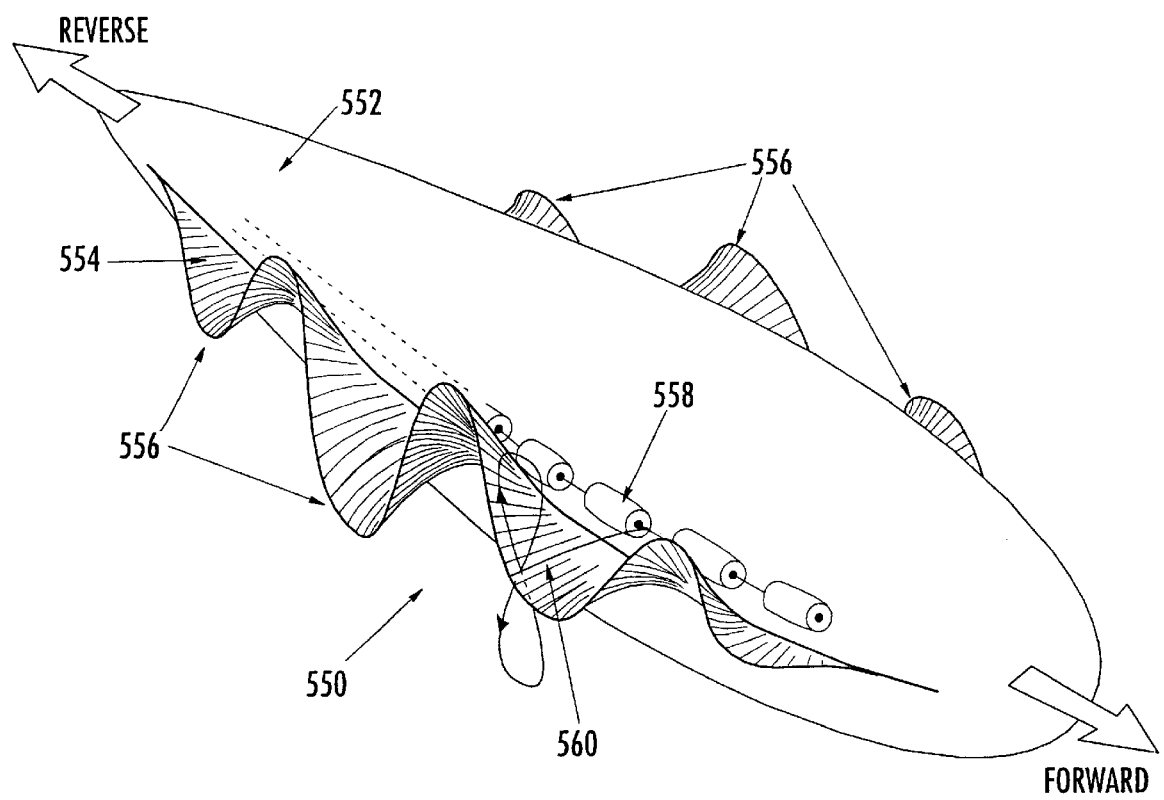
FIG. 21 is a perspective view of a submarine of the present invention.

A further embodiment of the present invention is shown in FIG. 21, in which a submarine 550 is illustrated. The submarine 550 includes an underwater hull 552 having a blunt nose, a tapered tail, and a plurality of undulating fins 554, each of which is formed of a cast rubber sheet. Each fin 554 is originally formed as a crescent shape, and its concave surface is fixed to the hull 552, which has a greater radius of curvature than the concave surface of the fins 554, such that multiple flexible undulations 556 form. A reciprocating motor 558 is mounted within the hull 552; a lever 560, or other oscillating means, extends from the motor 558 and is embedded in the fins 554, 556.

Reciprocating movement of the oscillating means (lever 560) causes nearby portions of the fins 554 to heave, pitch, bend, torque and surge. This motion causes the fins 554 to interact with the water to drive the pitch and thrust axis undulations to travel from one end of each of the fins 554 to the opposite end, thereby propagating the undulations as a wave in the water. The wave propagation produces thrust that propels the submarine in the desired direction. The tuned elastic compliant structure permits smooth propulsion with what may otherwise be an impractical shaky apparatus.

Another embodiment of the present invention is illustrated in FIG. 23, which shows an aircraft designated broadly at 600. The aircraft 600 includes a hull 602 and a pair of wings 604. The wings 604 are oriented relative to the hull 602 so that the heave axis H is tilted upwardly and rearwardly from the center of the hull 602. This tilting causes the thrust axis T to extend slightly downwardly and rearwardly from the center of the hull 602. Doing so balances both vehicle weight and thrust so that the flight path P is horizontal. This compares favorably to the vehicle 600' illustrated in FIG. 22, which, because its heave axis is perpendicular to the intended flight path, actually has a flight path that extends downwardly and forwardly from the hull of the vehicle 600' due to gravity. Prior art vehicles attempt to overcome this tendency by including other lift mechanisms, such as a tail, to provide additional lift, but these methods induce costs, thereby reducing aircraft efficiency. The vehicle 600 of the present invention requires no such additional lift mechanisms.

The foregoing embodiments are illustrative of the present invention, and are not to be construed as limiting thereof Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A vehicle maneuverable in a fluid medium, comprising:
    a vehicle body;
    a first bladelike element;
    a first tuned compliant elastic transmission shaft attached to said bladelike element; and
    a reciprocating unit for reciprocally driving said bladelike element within a fluid medium in a first travel path such that interaction between said bladelike element and a fluid medium produces propulsive forces that propel said vehicle body in a desired direction.

2. The vehicle defined in claim 1, wherein said first transmission shaft has pitch, thrust, and heave natural frequencies, and wherein said first bladelike element has a natural torsional and bending frequency, and wherein natural frequencies of said pitch, heave, and bending are approximately equal, and said natural thrust frequency is approximately twice that of said natural pitch frequency.

3. The vehicle defined in claim 1, wherein compliance of said first transmission shaft is selected such that said first travel path is a figure-8 path oriented normal to a longitudinal axis of said vehicle body.

4. The vehicle defined in claim 1, further comprising a second tuned compliant elastic transmission shaft attached to said reciprocating means and a second bladelike element connected with said second compliant elastic transmission shaft that follows a second travel path.

5. The vehicle defined in claim 4, wherein said reciprocating unit is configured such that said first and second travel paths are reciprocally opposed travel paths.

6. The vehicle defined in claim 4, wherein said reciprocating unit is configured such that said first and second travel paths are phase-controlled travel paths.

7. The vehicle defined in claim 4, wherein said first and second bladelike elements are embedded in respective winglike elements attached to said vehicle body.

8. The vehicle defined in claim 1, further comprising a primary drive unit attached to said vehicle body for primary thrust in a first direction, and wherein said first bladelike element is mounted to said first transmission shaft such that reciprocation thereof induces the vehicle to travel in said desired direction.

9. The vehicle defined in claim 1, wherein said vehicle body comprises a boat hull.

10. The vehicle defined in claim 1, wherein said vehicle body comprises a submarine hull.

11. The vehicle defined in claim 1, wherein said vehicle body comprises an aircraft fuselage.

12. A vehicle maneuverable in a fluid medium, comprising:
    a vehicle body;
    a plurality of bladelike elements;
    a plurality of tuned compliant elastic transmission shafts, each of which is attached to a respective one of said plurality of bladelike elements; and
    at least one reciprocating unit for reciprocally driving said bladelike elements within a fluid medium in travel paths such that interaction between said bladelike elements and a fluid medium produces propulsive forces that propel said vehicle body in a desired direction.

13. The vehicle defined in claim 12, wherein each of said transmission shafts has pitch, thrust, and heave natural frequencies, and wherein each of said bladelike elements has natural torsional and bending frequencies, and wherein said pitch, heave, torsional and bending frequencies are approximately equal, and said thrust frequency is approximately twice that of said pitch frequency.

14. The vehicle defined in claim 12, wherein compliance of said tuned transmission shafts is selected such that said travel paths are figure-8 paths oriented normal to a longitudinal axis of a vehicle body.

15. The vehicle defined in claim 12, wherein said reciprocating unit is configured such that said travel paths of said bladelike elements are phase-controlled.

16. The vehicle defined in claim 12, wherein said vehicle body comprises a submarine hull.

17. The vehicle defined in claim 16, wherein said bladelike elements are arranged in staggered circumferential rows about said submarine hull.

18. The vehicle defined in claim 16, wherein said bladelike elements are arranged in pairs on opposite sides of said submarine hull.

19. The vehicle defined in claim 12, wherein said vehicle comprises an aircraft fuselage.

20. The vehicle defined in claim 19, wherein said bladelike elements are arranged in pairs on opposite sides of said aircraft fuselage.

21. The vehicle defined in claim 20, wherein the compliance is modulated to control the axis of thrust output backward and downward to balance the requirements of both lift and thrust propulsion.

22. The vehicle defined in claim 16, wherein said submarine hull defines a longitudinal axis and includes a plurality of rotating sections, each of which rotates about said longitudinal axis, and wherein a pair of said bladelike elements is attached to each of said rotating sections.

23. The vehicle defined in claim 22, wherein said rotating sections are configured to rotate in opposed rotation sequences, thereby causing said bladelike elements to clap and fling relative to one another.

24. A vehicle maneuverable in a fluid medium, comprising:
   a compliant ring having a circumferential axis;
   an elastomeric wing having a circumference fixed to said ring and an opposed scalloped edge; and
   a reciprocating drive unit attached to said compliant ring for pivoting said compliant ring about said circumferential axis such that said scalloped edge of said wing reciprocally deforms, thereby propelling said vehicle within the fluid medium in a direction normal to a plane defined by said circumferential axis away from said scalloped edge.

25. A vehicle maneuverable in a fluid medium, comprising:
   a vehicle body having a longitudinal axis parallel with a direction of travel;
   an elastomeric wing having an edge fixed to said vehicle body and an opposed undulate edge, said fixed edge being disposed generally parallel to said direction of travel; and
   a reciprocating drive unit attached to said vehicle body for reciprocating said wing in a direction normal to said direction of travel such that said undulate edge of said wing reciprocally deforms in an undulating fashion, thereby propagating a wave along said wing in opposition to said direction of travel and propelling said vehicle within the fluid medium in said direction of travel.

* * * * *

UNITED STATES PATENT AND TRADEMARK OFFICE
CERTIFICATE OF CORRECTION

PATENT NO.    : 6,250,585 B1
DATED         : June 26, 2001
INVENTOR(S)   : Pell

It is certified that error appears in the above-identified patent and that said Letters Patent is hereby corrected as shown below:

<u>Column 1,</u>
Line 8, should read -- Patent Application ser. No. 60/057,959, filed 5 Sep. 1997. --

Signed and Sealed this

Twenty-sixth Day of March, 2002

Attest:

JAMES E. ROGAN
Attesting Officer    Director of the United States Patent and Trademark Office